Dec. 12, 1944.  W. A. ANDERSON  2,364,769
ACCOUNTING MACHINE
Filed Dec. 21, 1939     5 Sheets-Sheet 1

INVENTOR
WALTER A. ANDERSON
BY
ATTORNEY

Dec. 12, 1944.  W. A. ANDERSON  2,364,769
ACCOUNTING MACHINE
Filed Dec. 21, 1939  5 Sheets-Sheet 2

Fig. 3

INVENTOR
WALTER A. ANDERSON
BY
ATTORNEY

Dec. 12, 1944.　　W. A. ANDERSON　　2,364,769
ACCOUNTING MACHINE
Filed Dec. 21, 1939　　5 Sheets-Sheet 3

INVENTOR
WALTER A. ANDERSON
BY
ATTORNEY

Dec. 12, 1944.    W. A. ANDERSON    2,364,769
ACCOUNTING MACHINE
Filed Dec. 21, 1939    5 Sheets-Sheet 5

INVENTOR
WALTER A. ANDERSON
BY
*C. G. Julihn*
ATTORNEY

Patented Dec. 12, 1944

2,364,769

UNITED STATES PATENT OFFICE 2,364,769

ACCOUNTING MACHINE

Walter A. Anderson, Bridgeport, Conn., assignor to Underwood Elliott Fisher Company, New York, N. Y., a corporation of Delaware Application December 21, 1939, Serial No. 310,279

3 Claims. (Cl. 235—60)

This invention relates to accounting machines and more particularly to a means for preventing the automatic printing of negative totals.

Many accounting machines are equipped with a plurality of adding and subtracting totalizers. These totalizers are arranged to be jointly or independently selected, and may be used to compute balances of debit and credit postings entered during bookkeeping operations. In such operations it is customary to automatically print the total under the control of the traveling carriage when the carriage reaches the balance column of the bookkeeping form. Generally, this total printing occurs even though the particular totalizer selected has been overdrafted and the total is negative.

However, in certain bookkeeping operations it is desirable to prevent automatic printing of negative totals, i. e., to stop the machine before the total is printed, so that the operator is notified that an overdraft has occurred. It is often desirable to do this in connection with more than one totalizer.

It is an object of the present invention, therefore, to provide a machine, having a plurality of adding and subtracting totalizers, with an automatically operable means for preventing automatic printing of negative totals, and yet which will permit the printing of such totals when desired by the operator depressing the customary motor bar in the usual manner.

Another object of the invention is to provide an overdraft lock which automatically becomes effective, upon the occurrence of an overdraft in either totalizer, to prevent the automatic printing of a negative total from the overdrafted totalizer, but which will not affect the automatic printing of a positive total from the other totalizer.

With these and incidental objects in view, the invention consists in certain novel features of construction and combinations of parts, the essential elements of which are set forth in appended claims, and a preferred embodiment of which is hereinafter described with reference to the drawings which accompany and form part of the specification.

GENERAL DESCRIPTION

This machine is an improvement on the applications of Oscar J. Sundstrand, Serial No. 581,800 filed December 18, 1931, now Patent No. 2,194,270, and Serial No. 88,092, filed June 30, 1936, now Patent No. 2,209,240, and the application of Walter A. Anderson, Serial No. 182,682, filed December 31, 1937, now Patent No. 2,226,960.

The machine includes the customary keyboard with amount keys, date keys and totalizer controlling keys. It has the customary traveling paper carriage that is automatically tabulated from column to column, and which is automatically returned from a predetermined point in the carriage travel. The carriage includes a control plate carrying a series of magazines with control lugs for automatically controlling the numerous operations that are controlled manually by the keyboard.

The machine includes eight adding registers (not shown) and two adding and subtracting totalizers, four registers and one totalizer being located in an upper group, and the other four registers and totalizer being located in a lower group. All of the registers and totalizers are actuated by a common set of actuators, adjustable under control of pins set by the amount keys. The actuators also control the adjustment of type for printing amounts and totals. Each totalizer has separate transfer elements, and each is provided with overdraft mechanism for controlling the printing of negative balances.

The totalizers are selected manually by a lever operating independently of the selecting means for the adding registers. In its normal forward position this lever selects the upper totalizer. When moved one step to its intermediate position it selects both totalizers, and when moved another step to its rear position it selects the lower totalizer. The totalizers are automatically selected under the control of lugs in magazines mounted on the carriage control plate. When there is no lug in the totalizer selecting position of a magazine, the upper totalizer is selected. A short lug in this position of the magazine selects both upper and lower totalizers, while a full length lug selects the lower totalizer alone.

Totals or sub-totals may be taken either automatically or manually from either the lower or upper totalizers. To take totals manually, the shift lever is moved to either its forward or rear position to select the desired totalizer, and a blank cycle taken, the totalizer total or sub-total key is then depressed, and the machine again operated.

To take totalizer totals automatically, the desired totalizer is selected by the carriage as explained above. The machine is then given a blank cycle of operation (also by the carriage), and the carriage advances to the next columnar position where total or sub-total lugs control the machine to take the total out of the selected totalizer.

The mechanism for selecting and actuating the totalizers as described in the foregoing is disclosed in detail in the aforementioned applications. Therefore, only a brief description of these parts will be given.

The present invention provides a lock that is operable under the control of overdraft mechanism associated with the upper and lower totalizers and that cooperates with the carriage controlled motor repeat mechanism in such a manner as to prevent operation of the latter for cycling the machine, when an overdraft has occurred in the totalizer from which the total is to be taken. The lock is arranged to be held ineffective in all columnar positions except the new balance columnar positions.

DETAILED DESCRIPTION

*Index of topics*

1. The machine sections and actuating mechanism.
2. Totalizers—in general.
3. Selection of totalizers.
4. Engagement of totalizers.
5. Actuation of totalizers.
6. Taking totals from the totalizers.
7. Control exercised by the totalizers for conditioning the machine for taking negative totals.
8. Lock to prevent automatic total taking from a totalizer containing a negative total.
9. General release of negative total lock by carriage control.
10. Preventing a negative total in one totalizer from controlling automatic total taking in the other totalizer.

1. *The machine sections and actuating mechanism*

Figure 1:
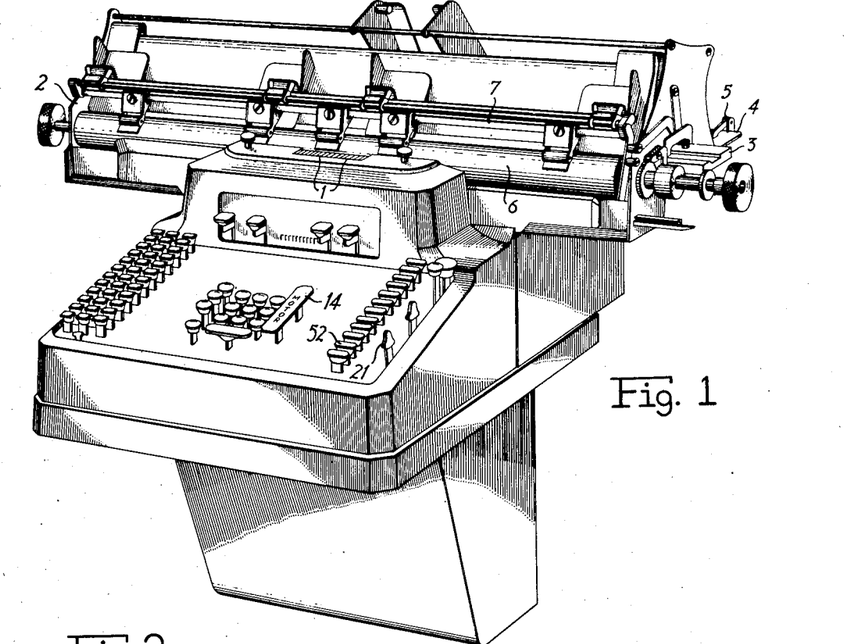
Figure 1 is a perspective view of an accounting machine embodying the invention.

Referring to Figure 1, the machine includes a keyboard, type bars 1 for printing on the inserted paper, a laterally movable paper carriage indicated generally at 2, mounted on a track 3, and a control plate 4 mounted on the traveling carriage and having a plurality of control magazines 5 for controlling the various operations in predetermined columnar positions. The carriage is provided with the customary roller platen 6 for the insertion of the paper at the rear thereof, and a customary bail structure 7 for use in feeding paper sheets in front of the platen.

The machine also includes eight adding registers (not shown), arranged in two groups situated one above the other, there being four registers in each group. The selection, engagement and actuation of these registers is fully shown and described in the before-mentioned application Serial No. 88,092. Each of these registers includes a plurality of ten-tooth wheels, and each is operable for adding only.

Figure 3:
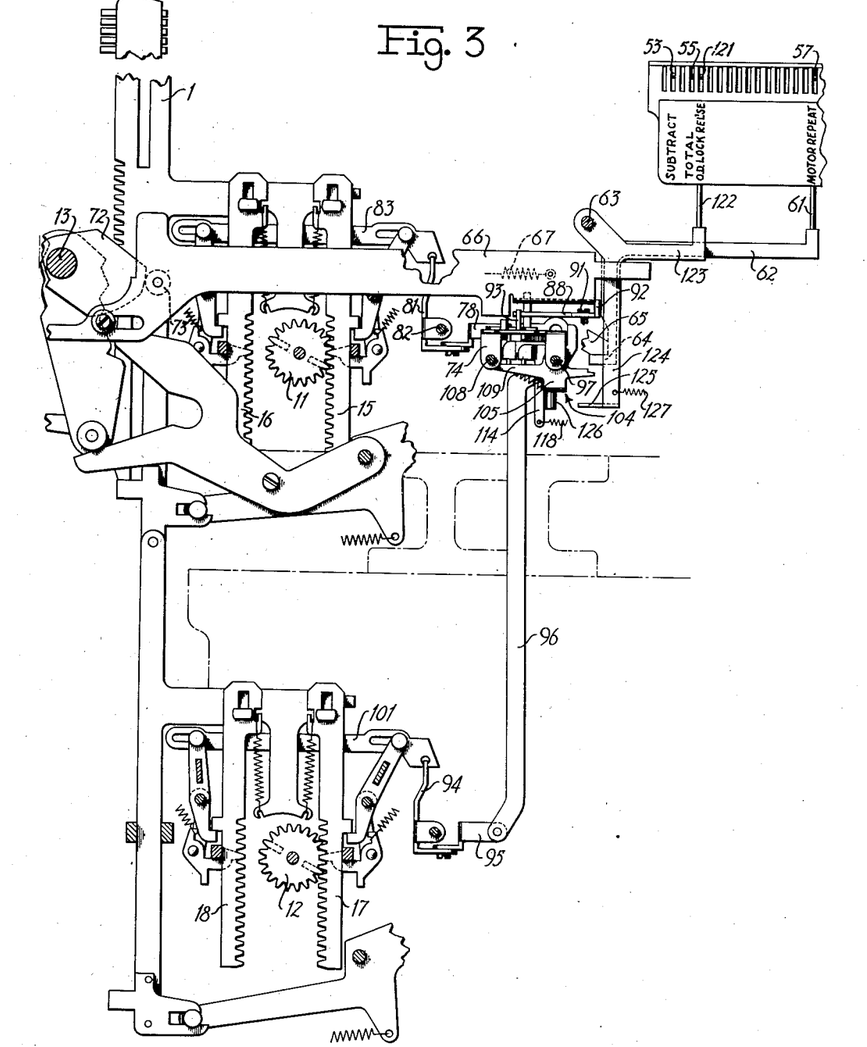
Figure 3 is a right side elevation showing the actuating mechanism and certain of the parts used in conditioning the machine for the taking of positive or negative totals.

Situated in front of these registers are two adding and subtracting totalizers, each having a plurality of twenty-tooth wheels 11 and 12 (Figure 3). These totalizers are arranged for both addition and subtraction.

Figure 2:
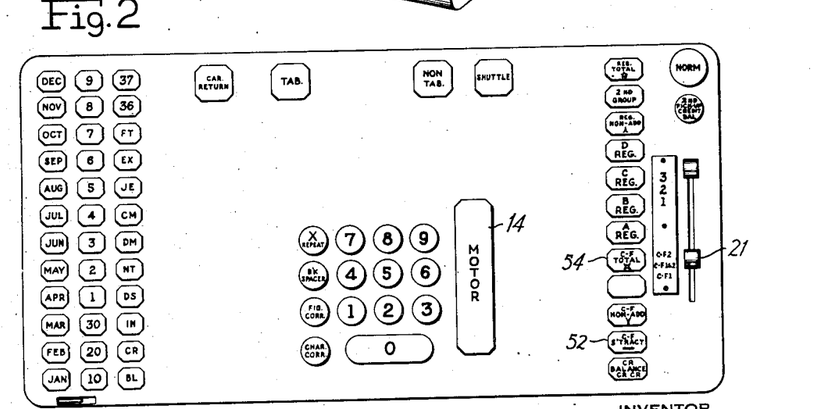
Figure 2 is a diagrammatic view of the keyboard thereof.

The conditioning of the machine for adding, subtracting, non-adding, total taking, sub-total taking, computing selectively in the various registers and totalizers, etc., is controlled manually by the keys and levers situated at the right hand side of the keyboard (Figures 1 and 2). These operations may be controlled automatically by selector levers such as those shown in Figure 5, under the control of the traveling carriage.

The machine is actuated by an electric motor (not shown). The motor is started by the closing of suitable switch mechanism, and is coupled to an actuating shaft 13 (Figures 3 and 4) by a suitable clutch mechanism upon depression of a motor bar 14 (Figure 1). The actuating shaft is connected with the motor drive in such a manner that it is rocked, first, counter-clockwise (Figure 3), and then clockwise, about ninety degrees during each operation of the machine.

2. *Totalizers—in general*

The two adding and subtracting totalizers are each composed of a number of twenty-tooth wheels 11 and 12 (Figure 3) engageable with actuating racks 15 and 16 for adding and subtracting respectively in the upper totalizer, and with racks 17 and 18 for adding and subtracting respectively in the lower totalizer. The two totalizers are each provided with a set of the usual transfer elements (not shown). These totalizers, together with their transfer and actuating elements are identical with those disclosed in application Serial No. 581,800, and therefore will not be described in detail.

3. *Selection of the totalizers*

The totalizers may be selected either manually or automatically for independent or joint engagement with their actuating racks. The manual means for selecting the totalizers comprises a lever 21 (Figure 4) pivoted on a stud 22 and carrying a stud 23 on its lower arm. Lever 21 is movable to any of three positions, as indicated by numerals "1," "2" and "3" in Figure 4. A pair of identical detent arms 24 are pivoted on a common stud 25 and each has three opposing notches adapted to embrace stud 23. A strong spring 26 holds the latch arms together to retain lever 21 in any moved position. The studs 22 and 25 are mounted on a plate 27 secured to the machine frame. When lever 21 is in position No. 1 indicated in Figure 4, the upper totalizer is selected for engagement. When the lever is in its intermediate or No. 2 position, both totalizers are selected for engagement, and when the lever is in its No. 3 position, the lower totalizer is selected for engagement.

A slide 28 is pivoted on a stud 31 on the upper arm of lever 21, and is slidably mounted at its rear end on a stud 32 in the machine frame. The rear end of slide 28 is rounded and underlies a flange 33 formed on a totalizer selection blank 34. Blank 34 is pivoted intermediate its ends on a stud 35 in the machine frame, and is tensioned counted-clockwise by a spring 36 fastened between the blank and the machine frame. This counter-clockwise tension is restricted by flange 33 contacting slide 28. Blank 34 is provided at its forward end with two notches 37 and 38 below flange 33. The notches 37 and 38 are arranged to engage a square stud 41 projecting from an upstanding arm 42 on the rear of a totalizer control slide 43. Slide 43 corresponds to the slide 37 in application Serial No. 182,682 and is similarly mounted for forward and rearward movement on the machine frame under the control of a roller 44 carried by an arm 45 secured to actuating shaft 13. The arm 45 in its normal position (when the machine is at rest), shown in Figure 4, holds slide 43 sufficiently rearward against suitable spring tension that normally urges it forward, to provide clearance between stud 41 and notch 37 to permit adjustment of the latter without hindrance from these parts.

Figure 4:
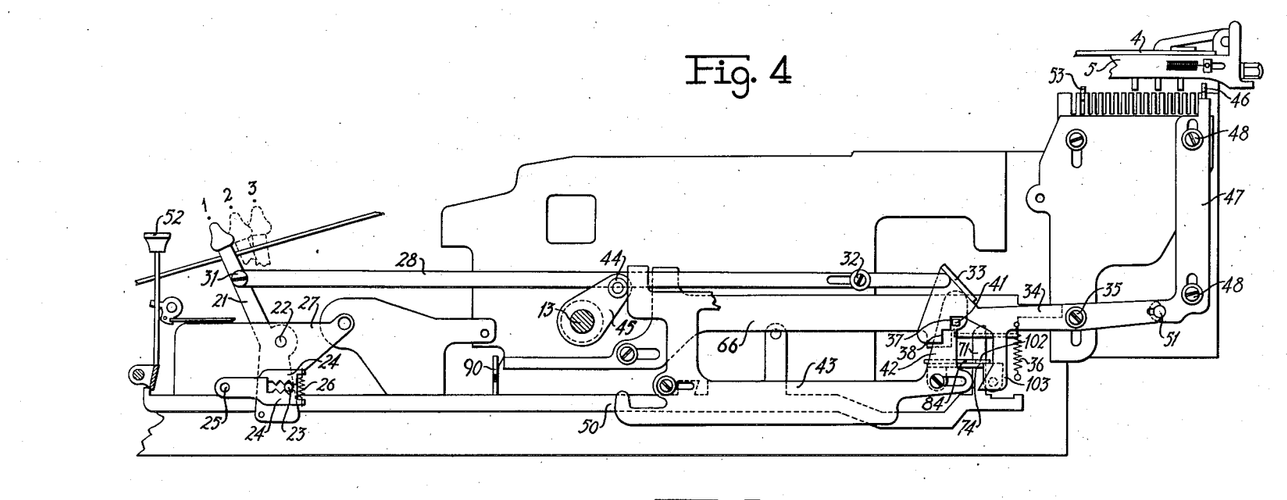
Figure 4 is a right side elevation showing the automatically control totalizer selecting mechanism with the parts in position for selecting the upper crossfooter alone.

As previously stated, when the machine is cycled, actuating shaft 13 is rocked first counter-clockwise and then clockwise back to normal position. When lever 21 is in its No. 1 position, slide 28 retains blank 34 in a position where notch 37 lies in the path of the forward movement of stud 41 of the totalizer control slide 43.

When it is desired to accumulate in both totalizers jointly, the totalizer selecting lever 21 is moved to its No. 2 or intermediate position. When it is so moved, it moves slide 28 rearwardly, and by virtue of contact with flange 33 it cams selection blank 34 clockwise about its pivot 35 against tension of spring 36 a distance sufficient to raise lower notch 38 into the path of stud 41 on the control slide 43. Spring 26 of detent arms 24 is superior to spring 36 of blank 34, and thus maintains the blank in its adjusted position. When the machine is cycled following the adjustment of the parts, as above described, slide 43 is permitted to come further forward than when notch 37 lies in the path of stud 41, and thus permits selection of both of the totalizers for engagement with the actuating racks.

When it is desired to accumulate in the lower totalizer to the exclusion of the upper totalizer, selecting lever 21 is moved to its No. 3 position. This causes slide 28 to move an additional step rearwardly and cams selection blank 34 an additional step clockwise, raising notch 38 above the path of stud 41. Cycling of the machine with lever 21 in this position allows slide 43 to move to its extreme forward position wherein the lower totalizer is selected.

Automatic selection of the totalizer is under the control of lugs contained in magazines 5 secured on the control plate 4. The general manner in which these lugs act upon various mechanism for controlling the machine functions, with one exception, is well known, and is fully described in application Serial No. 581,800 and will, therefore, not be given here. From Figure 5, it will be observed that as the carriage advances into its various columnar positions, the control lugs depress corresponding levers, which in turn depress corresponding rods. The exception mentioned is the automatic totalizer selection control that occupies what is known as the No. 18 or the rearmost carriage control position. The end 46 (Figure 4) of this lever (which is similar to the levers shown in Figure 5) overlies the upper end of a vertically disposed slide 47 mounted on studs 48 on the machine frame. The lower end of slide 47 carries a stud 51 which lies in the bifurcated end of a rearward extension formed on totalizer selection blank 34. Spring 36 normally holds slide 47 in its elevated position. When the control lugs depress lever 46, slide 47 is moved downwardly, rocking blank 34 clockwise about pivot 35 against the tension of spring 36. The degree of movement imparted to slide 47 determines which totalizer shall be selected.

During automatic selection, the manual selecting lever 21 is left in its No. 1 position. When it is desired to automatically select the upper totalizer in a certain columnar position, the No. 18 (totalizer selecting) position of the magazine 5 is not provided with a lug. When the carriage tabulates to this columnar position and the machine is cycled by the automatic motor repeat mechanism to be later described, notch 37 of blank 34 lies in the path of stud 41 the same as described in connection with manual selection of the upper totalizer, and the upper totalizer is, therefore, selected.

When it is desired to automatically select the totalizers for joint operation, a short lug is placed in the No. 18 totalizer selecting position of magazine 5 of the columnar position in which such joint selection is desired. When the carriage tabulates to the position of this magazine, selector 46 is partially depressed and slide 47 moved downwardly a sufficient distance to rock selection blank 34 to a position where notch 38 lies in the path of stud 41 and, as above explained in connection with manual selection of the totalizers, movement of blank 34 to this position results in selection of both totalizers upon operation of the machine.

The lower totalizer is automatically selected by placing a full length lug in the No. 18 position of the appropriate magazine. When the carriage tabulates to this magazine, this full length lug depresses slide 47 its full distance of travel, which in turn moves blank 34 clockwise its full amount about pivot 35. This, as before described, permits slide 43 to move forward its full amount of travel upon operation of the machine to select the lower totalizer to the exclusion of the upper, as previously described in connection with manual selection thereof under the control of lever 21.

The parts connected with and controlled by the movement of slide 43 to effect selection of the totalizers, is disclosed in detail in application Serial No. 182,682.

4. *Engagement of the totalizers*

Having made the proper totalizer selection, engagement thereof with the actuating racks is next effected. Engagement of the totalizers is accomplished on this machine by parts identical with and operable in exactly the same manner as those disclosed in the above-mentioned application Serial No. 182,682. Suffice it here to say that during accumulating operations, the totalizer or totalizers are withdrawn from the actuating racks during the first half of the machine cycle, i. e., as shaft 13 is rocked in its counterclockwise direction, and subsequently reengaged with the racks as shaft 13 starts to rock in its clockwise direction during the second half of the cycle, the totalizers being disengaged and engaged singly or jointly in accordance with their selection.

5. Actuation of the totalizers

The actuation of the totalizers following their engagement with the adding or subtracting racks has been fully described in the co-pending applications Serial Nos. 581,800 and 88,092, of Oscar J. Sundstrand, hereinbefore mentioned. It will be sufficient to state that these racks 15 to 18 (Figure 3) are arranged for simultaneous vertical reciprocable movement during every addition cycle. When the upper totalizer is engaged, their action is only upon the totalizer wheels 11; when both upper and lower totalizers are engaged, their action is upon totalizer wheels 11 and 12 jointly; and when the lower totalizer is engaged exclusive of the upper totalizer, their action is solely upon the totalizer wheels 12.

Actuation of the totalizers during subtracting operations is the same as in adding operations except that the selected totalizer or totalizers are engaged with the subtracting racks 16—18 instead of the adding racks 15—17, during the second half of the accumulating cycle. The mechanism for causing such engagement is under the control of a subtract key 52 (Figure 2) and a corresponding carriage controlled lever 53 (Figure 3). This mechanism is identical with the subtraction mechanism disclosed in the above enumerated applications, and, briefly, comprises a slide 50 (Figure 4), corresponding to the slide 128 in application Serial No. 182,682, that is moved toward the left as viewed in this figure when either key 52 or lever 53 is depressed. Movement of the slide to the left conditions parts of the totalizer engaging mechanism, as disclosed in the above enumerated applications, to cause engagement of the totalizer with the subtracting racks upon the next operation of the machine.

6. Taking totals from the totalizers

When it is desired to take a total from either the upper or the lower totalizer, it is necessary to put the machine through a blank cycle with the selecting lever 21 (Figure 4) in either its forward or rearmost position. This blank cycle is for the dual purpose of restoring any tripped transfer elements and for engaging the selected totalizer with its actuating racks. As before stated, the totalizer engaging mechanism is identical with that disclosed in the previously mentioned applications, and hence a detailed description is unnecessary. Suffice it to say that with lever 21 in its forward position during the blank cycle, the upper totalizer will be engaged preparatory to taking a total. Similarly, with lever 21 in its rearmost position during the blank cycle, the lower totalizer will be engaged preparatory to taking a total.

On the next or total taking cycle, the timing of the totalizer engaging mechanism is altered either by depression of the totalizer total key 54 (Figure 2) or by operation of the corresponding carriage controlled lever 55 (Figure 3), as explained in the above mentioned applications. This change in timing of the engaging mechanism results in the selected totalizer being held in engagement with the racks during the ascent of the racks as shaft 13 swings counter-clockwise on the first half of the cycle, and disengagement of the totalizer from the racks just prior to their descent as shaft 13 swings clockwise during the latter half of the cycle. Printing of the total takes place when the racks and their associated type bars have risen to the highest positions of their differential movement under control of the totalizer wheels and before the disengagement of the totalizer and subsequent descent of the bars and racks. The printing mechanism is similar to that disclosed in the previously mentioned applications.

Ordinarily, in bookkeeping operations, it is desirable to automatically print the total of balances that have been computed in the totalizer upon the carriage reaching the new balance columnar position of the bookkeeping form. This is accomplished by placing a control lug in that position of the new balance magazine 5 that controls depression of selector lever 55 (Figure 3) and also placing a lug such as 56 (Figure 5) in that position of this same magazine that controls operation of certain automatic motor repeat mechanism now to be described. This automatic motor repeat mechanism includes a selector lever 57 pivoted at one end on a rod 58 stationary in the machine frame. The outer end of lever 57 overlies a rod 61 suitably guided for vertical movement in the machine frame and having its lower end resting upon a horizontal arm of a bell crank 62 (Figure 3) pivoted at 63 in the machine frame. A vertical arm 64 of this bell crank (see also Figure 6) is recessed to receive the rear end of a link 65 corresponding to link 826 in application Serial No. 581,800. As disclosed in that application, the forward end of link 65 is suitably connected with the motor switch controlling and clutch engaging mechanism that is operated manually by motor bar 14 so that as the carriage advances to the new balance column, lug 56 depresses lever 57, rocking bell crank 62 clockwise about pivot 63 and thrusting link 65 toward the left to initiate an automatic cycle, during which, due to the presence of a total lug in this magazine, the selector lever 55 is also depressed and a total from the selected totalizer is normally automatically printed.

7. Control exercised by the totalizers for conditioning the machine for taking negative totals Totalizer wheels 11 and 12 are normally in mesh with adding racks 15 and 17 respectively (Figure 3) in both accumulating and total taking operations. As before stated, depression of the substraction key 52 or the corresponding carriage controlled lever 53 conditions mechanism for engaging the selected totalizer with its corresponding set of subtracting racks 16 or 18 in accumulating operations. A mechanism similar to that disclosed in the previously mentioned applications is provided on this machine to insure automatic engagement of the selected totalizer with the subtracting racks during the blank cycle preceding the taking of a total, in the event that the totalizer has become overdrafted, i. e., credit amounts have exceeded debit amounts creating a negative total.

This mechanism includes a slide 66 (Figures 3, 4 and 6) guided for horizontal reciprocation forwardly and rearwardly of the machine, said slide being impelled forward by a spring 67. On the rear end of slide 66 is an inwardly projecting arm 68 (see Figure 6) arranged to engage an upstanding arm 71 on slide 50 operated by subtraction key 52 or lever 53, for the purpose of pushing the slide 50 toward the left (Figure 4) into effective position. After each operation of slide 66, it is restored to its normal rear position by a cam 72 (Figure 3) secured to actuating shaft 13, the cam engaging a roller 73 on the slide as the actuating shaft approaches the end of its return movement.

Slide 66 is prevented from operating to move slide 50 into effective position except when there is an overdraft in the selected totalizer. This mechanism includes an overdraft slide 74 (Figure 6), movable transversely of the machine. Slide 74 carries an upstanding post 75 lying normally in the path of a shoulder 76 on slide 66 to prevent said slide from moving forward under the influence of its spring 67. A spring 77 connected between slide 74 and the machine frame tends to move the slide to the right as viewed in Figure 6 to remove post 75 from the path of shoulder 76.

When there is a positive balance in the totalizer, slide 74 is prevented from moving to the right under the influence of spring 77 to release slide 66 by a stop arm 78 (see also Figure 3) fixed to a bail 81 pivoted on a rod 82. The upper end of bail 81 is arranged to be moved by a link 83 whenever the totalizer passes through zero in either direction. When passing from positive to negative, link 83 moves to the right (Figure 3), thereby lowering stop arm 78, and when passing from negative to positive, it raises stop arm 78 to the position shown in Figures 3 and 6. A lever 84 (Figure 6) is pivoted on slide 74 at 85 and is tensioned counter-clockwise by a spring 86 connected between the lever and slide. A stud 87 on slide 74 restrains lever 84 in the position shown in Figure 6. The right end of lever 84 lies normally in the same horizontal plane as the end of stop arm 78. Thus, when there is a positive balance in the totalizer, lever 84 and slide 74 are held by stop arm 78 in position to enable post 75 to prevent slide 66 from moving leftward. However, when there is a negative balance in the totalizer, slide 74 is permitted to move to the right under the influence of spring 77, removing post 75 from the path of shoulder 76, allowing slide 66 to pull slide 50 toward the left, as viewed in Figure 4, to condition the totalizer for subtraction.

In operations in which slide 74 is permitted to move to the right (Figure 6), it is restored to its left hand or normal position at the very end of the same operation by a lever 88 (Figure 3) pivoted on a stud 91 on the machine frame and operated by an upturned lug 92 thereon lying in the path of rearward movement of the rear end of slide 66. As slide 66 returns to its rear position, it contacts lug 92 and swings lever 88 about pivot 91, causing the left end of lever 88 to strike a stud 93 on slide 74 and move the slide to the position shown in Figure 6.

By the above described mechanism, it is apparent that when the totalizer contains a negative balance, post 75 (Figure 6) will be out of the path of leftward movement of slide 66, allowing this slide to pull slide 50 leftward to engage the totalizer with its subtracting racks during the blank cycle preparatory to the taking of a total. With the totalizer engaged with the subtraction racks, depression of control lever 55 (Figure 3) and automatic cycling of the machine by depression of the motor repeat lever 57 normally results in the automatic printing of a proper negative total.

Suitable means, including a slide 90 (Figure 4), is provided to prevent slide 66 from moving forward during accumulating operations that are performed while the totalizer involved is overdrafted. This means is fully disclosed in application Serial No. 581,800.

When taking a negative total from the lower totalizer, it is necessary, as in the case of the upper totalizer, to have the totalizer engaged with its subtraction racks instead of its addition racks. Since the actual engaging of the lower totalizer with the subtraction racks is controlled by a movement of the same slide 50 involved in engaging the upper totalizer with its subtraction racks, it is only necessary to provide sufficient additional mechanism to cause the presence of a positive balance in the lower totalizer to hold slide 74 (Figure 6) in its left position and to cause the presence of a negative balance to allow slide 74 to move to the right. This mechanism includes a bail 94 (Figure 3), similar to bail 81, to which is secured an arm 95 having a pivotal connection with the lower end of a pitman 96. The upper end of the pitman is slidably supported on a rod 97 and has a laterally turned stop arm 98 (see also Figure 6) lying in the same horizontal plane as stop arm 78. When the lower totalizer passes from positive to negative, a link 101 (Figure 3) is moved to the right, and when it passes from negative to positive, the link is moved to the left in the same manner as above described in connection with link 83. This has the effect of lowering and raising stop arm 98 similarly to the movements of arm 78.

Figure 6:
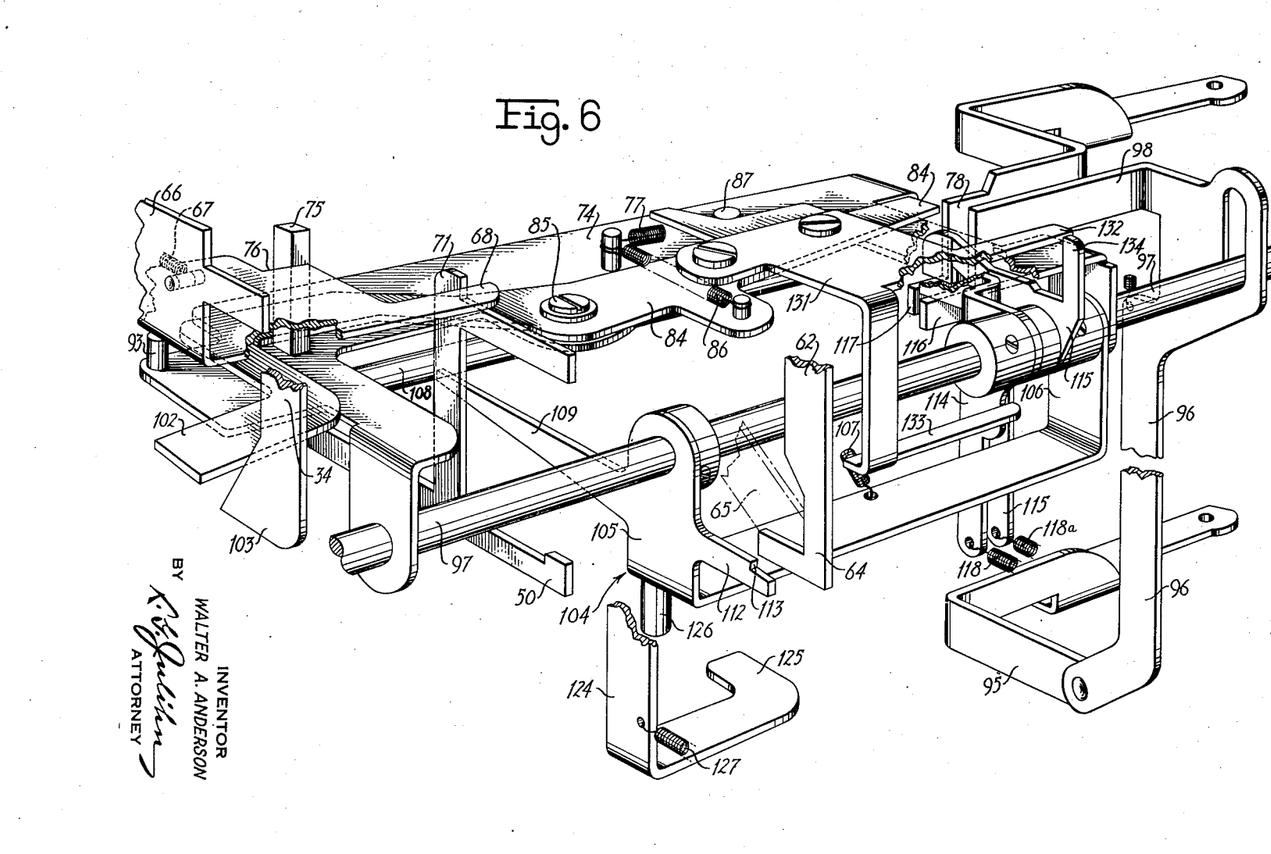
Figure 6 is a detail perspective view (greatly enlarged) of the overdraft lock, together with appurtenant parts for controlling the operation thereof.

Referring to Figure 6, a projection 102 on the left end of lever 74 lies in the path of a downwardly extending projection 103 on totalizer selection blank 34 (see also Figure 4). By these connections, when lever 21 is moved from either its forward (No. 1) or intermediate (No. 2) position to its rear (No. 3) position for selecting the lower totalizer alone, projection 103 moves projection 102 to the left, swinging the right end of lever 84 (Figure 6) to the right against the tension of spring 86 until it lies opposite stop arm 98. Now, upon operation of the machine through a blank cycle, slide 74 is held in its left position if the balance in the lower totalizer is positive, and is allowed to move to the right if the balance is negative. As in connection with the upper totalizer, movement of slide 74 to the right allows slide 66 to move to the left for engaging the totalizer with the subtraction racks.

Following such conditioning of the lower totalizer during a blank cycle, the carriage tabulates to the new balance column, and upon the simultaneous depression of automatic total lever 55 and motor repeat lever 57, normally an automatic cycle is initiated, during which a negative total is printed if the lower totalizer contains a negative total.

8. *Lock to prevent automatic total taking from a totalizer containing a negative total*

As before stated, it is desirable in certain bookkeeping operations to prevent automatic printing of negative totals from either of the totalizers, so that the operator will be notified that an overdraft has occurred. The following mechanism is therefore provided to prevent automatic cycling of the machine in the new balance column or columns when the selected totalizer contains a negative total.

A bail indicated generally at 104 (Figures 3, 6, 7 and 8) having upstanding sides 105 and 106 is pivoted on rod 97. A spring 107 connected between the bail and a rod 108 normally tensions the bail clockwise about rod 97, and a leftwardly extending arm 109 formed on side 105 bears against rod 108, limiting the clockwise movement and holding the bail in the position shown in Figures 3 and 6. An extension 112 formed on side 105 has a shoulder 113 arranged to engage the lower end of the vertical arm 64 of bell crank 62 when bail 104 is permitted to rock counter-clockwise about rod 97. Such counter-clockwise movement of the bail is controlled by either of two levers 114 or 115 pivoted on rod 97 adjacent side 106 of the bail. A horizontal arm of lever 114 rests upon an extension 116 formed on stop arm 98, and a horizontal arm of lever 115 rests upon a similar extension 117 formed on stop arm 78, vertically depending arms on each of the levers being tensioned by springs 118 and 118a respectively, in a counter-clockwise direction about rod 97, to hold the vertical arms in contact with the bail and the horizontal arms of the levers in contact with extensions 116 and 117 of the stop arms.

Figure 8:
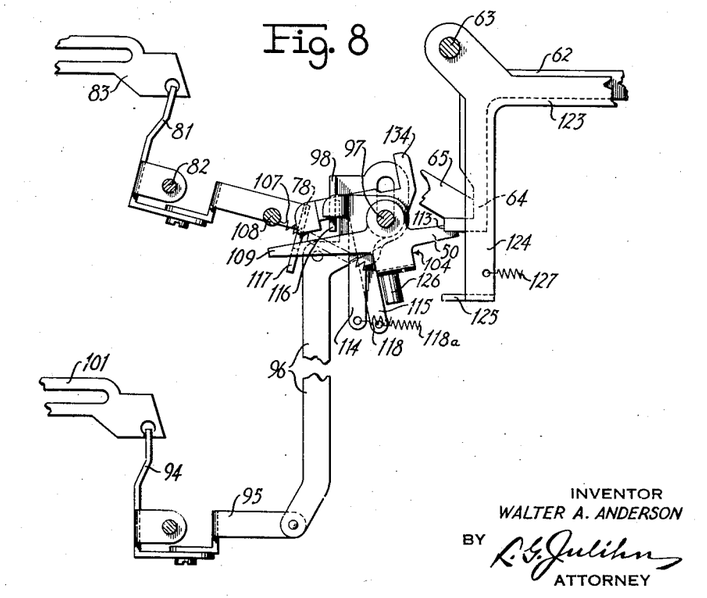
Figure 8 is a view similar to Figure 7, but showing the overdraft lock being actuated to effective position under the control of mechanism associated with the upper totalizer.

Each spring 118 and 118a is superior in strength to the spring 107. When the upper totalizer is overdrafted and stop arm 78 lowered, as described in the preceding section, lowering of extension 117 permits lever 115 to rock counter-clockwise about rod 97 under the tension of spring 118a. Counter-clockwise movement of the lever rocks bail 104 counter-clockwise against the tension of spring 107, and brings shoulder 113 into locking engagement with arm 64 of bell crank 62, as shown in Figure 8. This prevents movement of bell crank 62 from thrusting slide 65 to the left, and thus prevents automatic initiation of a machine cycle. Selector lever 57 may remain in its normal undepressed position while lug 56 (Figure 5) moves to, and remains in its normally effective position, through the presence of the customary bell crank 59 pivoted on the selector lever and normally maintained in operative position by a strong spring 60 that yields only when movement of the selector lever is so obstructed.

Similarly, when an overdraft occurs in the lower totalizer and stop arm 98 is lowered, the lowering of extension 116 permits lever 114 to swing counter-clockwise about rod 97 under tension of spring 118 to rock bail 104 in the same direction and place shoulder 113 in locking engagement with arm 64, as shown in Figure 7, also again locking the machine against an automatic cycle.

Restoration of either of the stop arms 78 or 98 by virtue of changing the balance in its corresponding totalizer from a negative to a positive character will, of course, cause its corresponding extension 116 or 117 to rise and swing its corresponding lever 114 or 115 clockwise about rod 97 against the tension of its spring 118 or 118a, whereupon spring 107 restores bail 104 to normal position shown in Figure 6, disengaging shoulder 113 from arm 64 and leaving the automatic motor repeat mechanism free to operate.

By the above mechanism, it is seen that when the carriage reaches the new balance column, wherein normally it would automatically print either a positive or a negative total from the selected totalizer, the automatic printing of such total is prevented when the totalizer contains a negative total. This notifies the operator of the occurrence of an overdraft. Of course, if the operator desires to print the negative total, this may be done in the usual manner by depressing motor bar 14, since the train of connections between the motor bar and the switch and clutch engaging mechanism are operable independently of the automatic motor repeat control of this mechanism, as fully disclosed in application Serial No. 581,800.

9. *General release of negative total lock by carriage control*

Since it is desirable to have the overdraft lock become effective only in the new balance column, the following means are provided to prevent operation of the lock in the columns preceding the new balance column.

Figure 5:
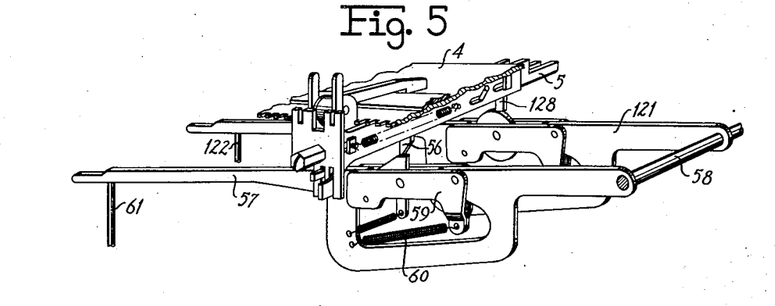
Figure 5 is a detail perspective view of the automatic motor repeat and overdraft lock release carriage controls.

Referring now to Figures 3 and 5, a selector lever 121 similar to selector lever 57 is pivoted on rod 58 and has its outer end lying above a rod 122, similar to rod 61 and likewise suitably guided for vertical movement in the machine frame. The lower end of rod 122 rests upon a horizontal arm of a bell crank 123 pivoted on rod 63 and having a depending arm 124 that is formed with a flange 125 lying in the horizontal plane of a stud 126 fixed on bail 104. A spring 127 connected between arm 124 and the machine frame normally holds the parts in the position shown in Figure 3.

Lugs such as 128 (Figure 5) are placed in those magazines 5 occupying all of the columnar positions on control plate 4 excepting the new balance columnar position. As the carriage tabulates through these columns, the lugs 128 depress selector lever 121 and in turn rod 122, rocking bell crank 123 clockwise about pivot 63 against the tension of spring 127. This movement of bell crank 123 causes flange 125 to engage stud 126 and thus prevent bail 104 from moving into effective position, so that even though an overdraft has occurred in the selected totalizer during the course of the bookkeeping operations, the motor repeat mechanism is free to operate, the lock being defeated by the above described mechanism until the carriage reaches the new balance columnar position. In this position, there is no lug 128 in the magazine 5 that controls the taking of new balance totals, hence, if there is an overdraft in the totalizer at this time, the lock is free to become effective and prevent the printing of the negative total, as described in a preceding section.

10. *Preventing a negative total in one totalizer from controlling automatic total taking in the other totalizer*

In the event that during a particular bookkeeping operation one of the totalizers has become overdrafted, say, for instance, the upper totalizer, and it is decided to take a total from the lower totalizer, it is necessary to prevent the negative total lock from being affected by the presence of the negative total in the upper totalizer. The following mechanism is provided to accomplish this.

A bracket 131 (Figure 6), having a pair of laterally extending arms 132 and 133 formed thereon, is secured on lever 84. Arm 132 cooperates with an upward extension 134 formed on lever 115, and arm 133 cooperates with the vertical depending arm of lever 114. Assuming that the upper totalizer has been selected, that an overdraft has occurred therein, and, in consequence, that bail 104 has swung to effective locking position, as shown in Figure 8, now upon selection of the lower totalizer, as lever 84 is swung clockwise about pivot 85, arm 132 abuts extension 134 and rocks lever 115 clockwise about rod 97. This movement releases bail 104 from the tension of the spring 118a, and permits spring 107 to restore the bail and withdraw shoulder 113 from locking engagement with the motor repeat bell crank 62. This leaves the motor repeat mechanism free to be operated in connection with the operations to be performed with the lower totalizer.

Figure 7:
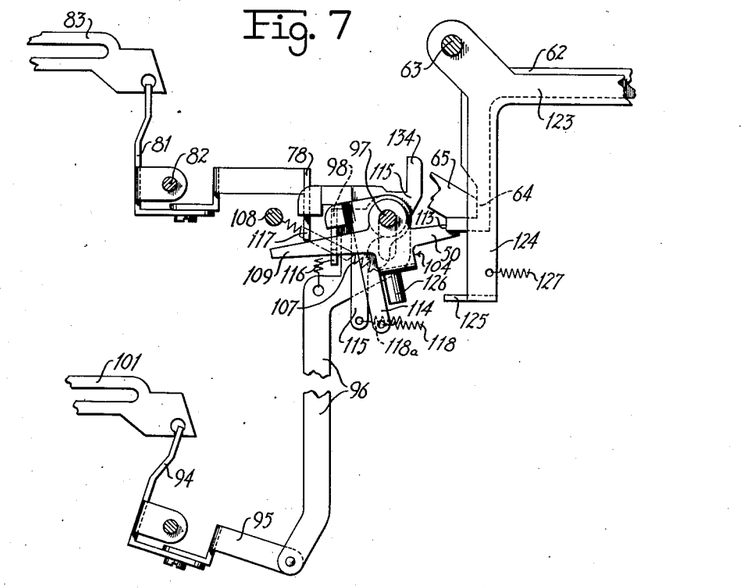
Figure 7 is a right side elevation showing the overdraft lock in effective position and being actuated under the control of mechanism associated with the lower totalizer.

Conversely, assuming that the lower totalizer has been overdrafted, and bail 104 and its shoulder 113 are in effective position, as shown in Figure 7, selection of the upper totalizer causes arm 133 to abut the vertical arm of lever 114 and swing this lever clockwise about rod 97, whereupon shoulder 113 is withdrawn from locking engagement with the motor repeat bell crank 82 under tension of spring 107. The motor repeat mechanism is now in readiness to function in connection with operations to be performed with the upper totalizer.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, two adding and subtracting totalizers, means for selecting the totalizers, means for conditioning the machine to take a negative total from a selected totalizer, means for initiating a machine cycle, and means under the control of the conditioning means for preventing operation of the cycle initiating means when the selected totalizer contains a negative total.

2. In a machine of the class described, a traveling carriage, two adding and subtracting totalizers, mechanism for selecting one or the other of the totalizers, overdraft mechanism associated with each totalizer for conditioning the selected totalizer for taking a negative total, a portion of said overdraft mechanism being common to both totalizers and selectable for cooperation with the selected totalizer under the control of the totalizer-selecting means, means for initiating an automatic cycle of the machine, means controlled by the overdraft mechanism of the selected totalizer for preventing operation of said automatic cycling means when the selected totalizer contains a negative total, and means under the control of the selectable common portion of said overdraft mechanism for preventing the overdraft mechanism associated with the other totalizer from controlling automatic cycling of the machine while said other totalizer is not selected.

3. In a machine of the class described, a traveling carriage, two adding and subtracting totalizers, mechanism for selecting either totalizer, overdraft mechanism for each totalizer for conditioning a selected totalizer to take a negative total, a portion of said overdraft mechanism being common to each totalizer and selectable for cooperation with the selected totalizer under the control of the totalizer-selecting mechanism, means under the control of the carriage for initiating an automatic cycle in predetermined columnar positions including a total-taking position, a lock for locking said automatic cycle-initiating means against operation, means normally tending to hold said lock in ineffective position, two means each under the control of the corresponding overdraft mechanism tending to move the lock into effective position upon the occurrence of an overdraft, means operable by the said common portion of said overdraft mechanism to render one or the other of the said lock-moving means ineffective, in accordance with the totalizer selected, and means under the control of the carriage to prevent movement of the lock into effective position until the carriage tabulates to the total-taking position.

WALTER A. ANDERSON.